United States Patent
Bienstman et al.

(10) Patent No.: US 9,477,136 B2
(45) Date of Patent: Oct. 25, 2016

(54) RESERVOIR COMPUTING USING PASSIVE OPTICAL SYSTEMS

(71) Applicants: Universiteit Gent, Ghent (BE); IMEC VZW, Leuven (BE)

(72) Inventors: Peter Bienstman, Ghent (BE); Joni Dambre, Destelbergen (BE); Kristof Vandoorne, Ghent (BE)

(73) Assignees: UNIVERSITEIT GENT, Gent (BE); IMEC VCW, Leuven (BE)

( * ) Notice: Subject to any disclaimer, the term of this patent is extended or adjusted under 35 U.S.C. 154(b) by 6 days.

(21) Appl. No.: 14/324,459

(22) Filed: Jul. 7, 2014

(65) Prior Publication Data

US 2015/0009548 A1 Jan. 8, 2015

Related U.S. Application Data

(60) Provisional application No. 61/843,122, filed on Jul. 5, 2013.

(51) Int. Cl.
*G06E 3/00* (2006.01)
*G02F 3/00* (2006.01)
*G06N 3/067* (2006.01)

(52) U.S. Cl.
CPC ............. *G02F 3/00* (2013.01); *G06N 3/0675* (2013.01)

(58) Field of Classification Search
CPC ........ G02F 3/00; G02F 2202/32; G02F 3/02; G02F 1/225; G02F 1/3515; G02F 2201/02; G06N 99/002; G06N 3/067; B82Y 20/00
USPC ................................................. 359/107, 108
See application file for complete search history.

(56) References Cited

U.S. PATENT DOCUMENTS

2014/0214738 A1* 7/2014 Pickett ................. G06N 3/0635
706/27

OTHER PUBLICATIONS

Larger et al., Photonic Information Processing Beyond Turing: an Optoelectronic Implemenation of Reservoir Computing, Jan. 30, 2012, Optics Express, vol. 20, No. 3, pp. 3241-3249.*
Vandoorne, Kristof et al., "Toward Optical Signal Processing Using Photonic Reservoir Computing", Optics Express, vol. 16, No. 15, pp. 11182-11192, Jul. 21, 2008.
Vandoorne, Kristof et al., "Parallel Reservoir Computing Using Optical Amplifiers", IEEE Transactions on Neural Networks, vol. 22, No. 9, pp. 1469-1481, Sep. 2011.
Appeltant, L. et al., "Information Processing Using a Single Dynamical Node as Complex System", Nature Communications,pp. 1-6, Sep. 13, 2011. DOI: 10.1038/ncomms1476, www.nature.com/naturecommunications.

* cited by examiner

*Primary Examiner* — Jade R Chwasz
(74) *Attorney, Agent, or Firm* — Workman Nydegger

(57) ABSTRACT

A method comprising providing an input signal to at least one input node of a computing reservoir by temporally encoding the input signal by modulating the at least one photonic wave as function of the input signal is described. The method further comprises propagating the at least one photonic wave via passive guided or unguided propagation between discrete nodes of the computing reservoir, in which each discrete node is adapted for passively relaying the at least one photonic wave over the passive interconnections connected thereto. The method also comprises obtaining a plurality of readout signals, in which each readout signal is determined by a non-linear relation to the at least one photonic wave in at least one readout node of the computing reservoir, and combining this plurality of readout signals into an output signal by taking into account a plurality of training parameters.

14 Claims, 4 Drawing Sheets

| 10 ↘ | |
|---|---|
| 11— | Providing input to input node as physical quantity |
| 12— | Passively propagating physical quantity between discrete nodes |
| 13— | obtaining readout signals non-linearly related to physical quantity in readout node |
| 14— | combining readout signals into output signal, taking training parameters into account |

RESERVOIR COMPUTING USING PASSIVE OPTICAL SYSTEMS

FIELD OF THE INVENTION

The invention relates to the field of information processing and machine learning. More specifically it relates to systems and methods for reservoir computing using passive optical systems.

BACKGROUND OF THE INVENTION

Nowadays, when one can easily be swamped with data, the relevant question in many applications is no longer how to acquire data, but how to extract the most relevant information from it. Machine learning is a research field dealing with this kind of information processing, and a new paradigm from that field that gained a lot of popularity is Reservoir Computing (RC). The present invention relates to information processing, such as physical information processing, e.g., optical information processing, using this interesting paradigm of reservoir computing. Reservoir computing can find application in the analog domain, e.g., for analog signal classification or for implementing nonlinear analog filters or controllers for which no closed form specification is available, but also in the digital domain, e.g., for learning boolean functions or automata, signal regeneration or header recognition.

Like many methods in this field, reservoir computing is partly inspired by how the human brain works, but essentially, it is a method to use dynamical systems for computation. In reservoir computing, a dynamical system, further referred to as the computing reservoir, is excited by the inputs to be processed and its output states are trained to follow a desired output, e.g., by linear regression, while keeping the computing reservoir itself untrained. This is in contrast to recurrent neural network systems, which are notoriously difficult to train. The computing reservoir itself can be seen as a nonlinear pre-processor which projects a time-variant input signal into a higher dimensional space where it becomes easier to classify, e.g., using a linear classifier. For this, the reservoir is preferably in the proper dynamical regime at the edge of instability, such that the system is dynamic enough without becoming instable. When feedback from the output to the reservoir is allowed, any conceivable digital or analog computation on time-varying inputs, e.g., in the idealized case without noise, can be carried out. Even without such feedback, any problem that requires fading memory, which forms a broad class of problems, can be solved under some general and mild conditions. Reservoir computing advantageously offers a system which is easy to use, combined with computational capabilities matching or exceeding other state-of-the-art machine learning techniques for a broad range of applications such as speech recognition, time series prediction, pattern classification and robotics. Due to the lenient requirements for the computing reservoir, implementations have been demonstrated in the art on diverse hardware platforms ranging from a basin of water to cellular neural networks and bacteria.

Software-based state-of-the-art implementations of reservoir computing have in the recent past demonstrated good performance for a variety of tasks. However, dedicated hardware implementations may offer substantial speed gains and power savings.

For example, a photonics-based hardware implementation of RC allows for fully exploiting the advantages offered by light, e.g., low power, high bandwidth and inherent parallelism, for computational purposes, especially when the input information is already encoded in the optical domain such as in many telecom applications or in image processing. Optical computing reservoirs, based on a fibre and a single dynamical node, are known in the art. Appeltant et al. disclosed such an approach in Nature Communications 2, article number 468. However, fibre-based approaches may have the disadvantages of being fairly bulky, being not stable enough to exploit information encoded in the phase component of the light, having a not very flexible interconnection topology and offering poor scalability.

In other optical reservoir computing approaches known in the art, on-chip solutions with optical amplifiers have been used, for example as disclosed by Vandoorne et al. in Optics Express 16(15), pp. 11182-11192. Here, it was shown that integrated optical chips with a network of coupled Semiconductor Optical Amplifiers (SOAs) can be used for reservoir computing. This offers the advantage of a small footprint and permits the use of coherent light, such that a performance improvement can be achieved over real-valued networks traditionally used in software implementations as well as over fibre-based approaches. However, the integrated optical chip disclosed by Vandoorne et al. may be not very power efficient, e.g., due to the need for optical amplifiers. Furthermore, it requires a difficult technology, e.g., complex manufacturing processes and relatively costly components. Furthermore, such approach may only offer a limited speed, e.g., fundamentally limited by the carrier lifetime.

SUMMARY OF THE INVENTION

It is an object of embodiments of the present invention to provide good and efficient reservoir computing based on optical systems.

It is an advantage of embodiments of the present invention that versatile reservoir computing is provided, e.g., a single method and/or device according to embodiments can be suitable for a wide variety of machine learning tasks, e.g., for boolean function learning as well as spoken digit recognition.

It is an advantage of embodiments of the present invention that an optical computing reservoir is provided, e.g., a passive silicon photonics reservoir chip, which consumes substantially zero power, e.g., does not require energy input except for providing the input and acquiring the output.

It is an advantage of embodiments of the present invention, that phase information encoded in a wave-like physical phenomenon, can be exploited for reservoir computing operations, e.g., in addition to amplitude information encoded therein.

It is an advantage of embodiments of the present invention, that good scalability to larger networks and higher bitrates can be achieved.

It is an advantage of embodiments of the present invention, that high bitrates can be achieved, e.g., in the 20 to 200 Gbit/s range.

The above objective is accomplished by a method and device according to the present invention.

The present invention relates to a method for characterizing an input signal, the method comprising the steps of:
  providing an input signal to at least one input node of a computing reservoir by supplying at least one photonic wave to the at least one input node and by temporally encoding the input signal by modulating the at least one photonic wave as function of the input signal, propagating said at least one photonic wave via passive guided or unguided propagation between discrete nodes of said computing reservoir, each discrete node being adapted for passively relaying the at least one photonic wave over the passive interconnections connected thereto, obtaining a plurality of readout signals, in which each readout signal is determined by a non-linear relation to the at least one photonic wave in at least one readout node of said computing reservoir, and combining said plurality of readout signals into an output signal, said combining taking into account a plurality of training parameters.

Obtaining the plurality of readout signals may comprise obtaining the plurality of readout signals, wherein each readout signal is determined by an intensity, energy or power measurement of said at least one photonic wave in the at least one readout node.

The method may further comprise training said training coefficients by providing a plurality of training input signals to the at least one input node of the computing reservoir and determining said training parameters by evaluating a difference between the plurality of readout signals and reference output signals corresponding to the plurality of training input signals.

The present invention also relates to a computing reservoir device for characterizing an input signal, the computing reservoir device comprising a plurality of discrete nodes and a plurality of passive interconnections between these discrete nodes for propagating the at least one photonic wave between the discrete nodes, in which each discrete node is adapted for passively relaying the physical quantity over the interconnections connected thereto, the discrete nodes comprising:

at least one input node for receiving an input signal and temporally encoding the input signal in the at least one photonic wave on said at least one input node, and at least one readout node for providing a plurality of readout signals, in which each readout signal is determined by a non-linear relation to said at least one photonic wave in the at least one readout node.

The device further may comprise a processor for combining said plurality of readout signals into an output signal, said combining taking into account a plurality of training parameters.

At least a subset of said passive interconnections may form at least one closed loop to maintain at least a short-term memory of said at least one photonic wave.

The passive interconnections may comprise a delay line for transmitting said at least one photonic wave with a predetermined delay.

At least a subset of said passive interconnections may imprint a regular grid spatial structure on the computing reservoir device.

At least a subset of said interconnections may imprint a modular or stratified spatial structure on said computing reservoir device.

Each of said passive interconnections may provide a predetermined delay and/or attenuation of the at least one photonic wave when transferred via said interconnection.

Said at least one photonic wave may be an at least partially coherent light wave.

The plurality of discrete nodes may comprise passive optical splitters and/or optical combiners and said plurality of passive interconnections comprise optical waveguides and/or optical fibres.

The at least one input node may comprise an optical coupler for receiving the input signal as a light wave coupled into the reservoir computing device.

The at least one readout node may comprise an optical coupler for coupling out the light wave from said at least one readout node to a light intensity meter for producing the at least one readout signal, or in which the at least one readout node comprises a light intensity meter for producing a light intensity measurement at the at least one readout node as the at least one readout signal.

The computer reservoir device is a passive silicon photonics reservoir.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figures 1, 2:
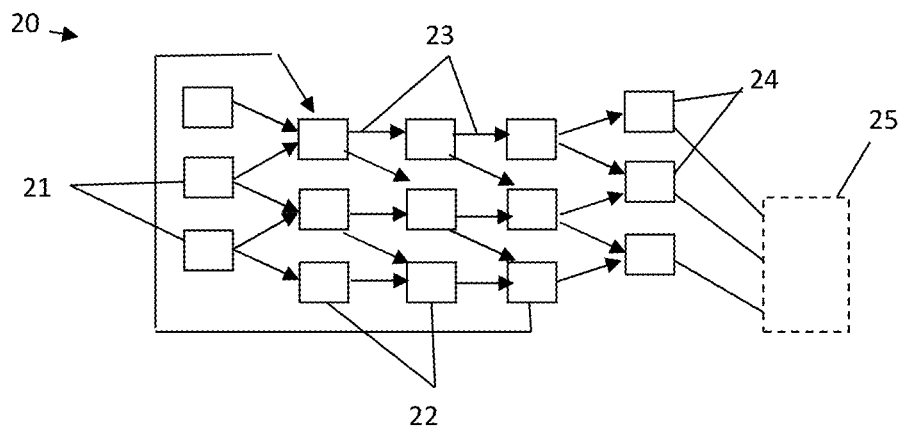
FIG. 1 illustrates a method for reservoir computing according to embodiments of the present invention.
FIG. 2 illustrates a schematic representation of an exemplary device according to an embodiment of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect, the present invention relates to a method for characterizing an input signal, e.g., for classifying the input signal in predetermined classes, for clustering the input signal or for providing an estimate of a corresponding output signal, such as for obtaining a regression output. Therefore, a method according to embodiments of the first aspect may for example be suitable for signal recognition, for estimating latent variables or unobserved output variables or for time series forecasting.

Referring to FIG. 1, an exemplary method 10 according to embodiments of the present invention is shown. This method comprises providing 11 an input signal to at least one input node of a computing reservoir, in which the input signal is temporally encoded in at least one photonic wave on the at least one input node, e.g., in a photonic wave or a physical property thereof at the at least one input node. The photonic wave or a property thereof may be quantifiable by measurement, e.g., can be represented as a number and a reference, the number being related to the input signal at the at least one input node.

Providing 11 the input signal to the at least one input node of the computing reservoir may comprise temporally encoding the input signal in a photonic wave. Thus, the physical quantity may be for example a light wave.

The input signal may for example be temporally encoded in such a photonic wave by modulating it. Temporally encoding the input signal in the photonic wave may thus comprise changing a property of a wave at the at least one input node, e.g., changing an amplitude, phase, intensity, frequency or polarization property of a wave. It is an advantage of such physical quantities that the input signal may be encoded in a complex-valued quantity, e.g., in a physical quantity having both a real and imaginary component. For example, such physical quantity may be represented by phase and amplitude components, which jointly propagate through the computing reservoir in a wave-like manner. For example, providing 11 the input signal to the at least one input node of the computing reservoir thus may comprise supplying at least one photonic wave to the at least one input node, in which this at least one photonic wave is modulated as function of the input signal.

Providing 11 the input signal also may comprise receiving a photonic wave that is modulated as function of a signal from another photonic component used for transferring or processing a signal.

The computing reservoir may be a passive system in which the physical quantity is split and recombined in discrete nodes in a linear manner. With the physical quantity being a photonic wave, this passive system may still allow for complex, non-linear processing due to a non linearity in the readout. Thus, the system may provide complex dynamical behaviour, e.g., can be maintained in a nearly-instable state, without requiring powered components such as amplifiers, provided the losses are small. The latter may result in a significant reduction in power used by the system, as well as in significant less effort being required for manufacturing the device.

The method 10 further comprises propagating 12 the photonic wave via a plurality of passive interconnections between discrete nodes of the computing reservoir. For example, the computing reservoir may comprise a plurality of discrete nodes, e.g., which may comprise mechanical resonators or optical splitters, for example, a number N of discrete nodes, in which N is in the range of 1 to 1000000, e.g., in the range of 10 to 10000, or in the range of 20 to 1000, for example 50 discrete units or 200 discrete units. Where reference is made to discrete units, physical bodies adapted for splitting and/or combining the photonic wave supplied via a predetermined set of passive interconnections are meant, e.g., manufactured units having a clearly defined structure. This is in contrast to, for example, elements of a continuous medium such as a fluid or units which lack a clearly defined stable form or structure, e.g., a manufactured structure, such as magnetic domains in a ferromagnetic material. Alternatively, continuous media can also be dealt with by evaluating them in a plurality of discrete points at their surface.

Each discrete node in this computing reservoir is adapted for passively relaying the photonic wave over the interconnections connected thereto. For example, the passive interconnections may comprise photonic wave conductors such as optical fibres or optical waveguides.

The discrete nodes may for example be adapted for receiving the physical quantity, e.g., photonic wave, from at least one interconnection connected thereto as a node input, and transmitting the physical the photonic wave to at least one interconnection connected thereto as a node output. For example, the discrete node may passively combine the photonic wave received from the node inputs, e.g., perform a complex summation of the inputs, and distribute the combined photonic wave over the output interconnections. The discrete node may therefore comprise for example an optical beam splitter. The discrete node may have at least three interconnections connected thereto, e.g., to perform at least an additive combination of two inputs to one output or a passive splitting of one input to two outputs. While splitting and combining of the physical quantity at the discrete nodes is, in accordance with embodiments of the present invention, a substantially passive process, e.g., does not add energy to the propagating photonic wave which was not received though this propagating photonic wave, the splitting and combining may be performed using non-uniform weights. For example, while in a discrete node according to some embodiments two inputs $Z_1, Z_2$ may be simply added to form a complex output $Z=Z_1+Z_2$, in a discrete node at least one of the inputs $Z_1, Z_2$ may also be attenuated, e.g. phase shifted, before addition, e.g., $Z=Z_1+a \cdot Z_2$ with $|a| \leq 1$, $a \neq 1$ and $a \neq 0$.

The method 10 further comprises obtaining 13 a plurality of readout signals, in which each readout signal is determined by a non-linear relation to the photonic wave in at least one readout node of the computing reservoir. This non-linear relation may for example be a square, power, polynomial or root transformation of the photonic wave. In advantageous embodiments of the present invention, the non-linear transformation may be an intensity or power measurement. For example, the photonic wave may have an amplitude-phase representation at the readout node, where the readout signal or a component of the readout signal is determined as an intensity, energy or power measurement of the photonic wave.

The readout values may be obtained simultaneously at a plurality of readout nodes of the computing reservoir, but may also be obtained by sampling at a plurality of readout nodes or at a single readout node, e.g., by obtaining readout values at different time instants at the readout node or readout nodes. The readout values may also be obtained by performing different non-linear transformations simultaneously at a single readout node, e.g., applying a series of non-linear transformations, e.g., a set of polynomial, exponential, root, trigonometric or other non-linear expressions.

The method 10 further comprises combining 14 the plurality of readout signals into an output signal, said combining taking into account a plurality of training parameters.

The method 10 may further comprise training these training coefficients by providing a plurality of training input signals to the at least one input node of the computing reservoir and determining the training parameters by evaluating a difference between the plurality of readout signals and reference output signals corresponding to the plurality of training input signals. For example, training the training coefficients may be performed in accordance with a supervised learning technique, e.g., as known in the art for training reservoir computing output weights. For example, output-error-minimizing weights may be computed. For example, teacher signals may be presented to the network, the readout signals of the readout units may be mapped on the teacher output, optionally discarding a first set of input/readout pairs for accommodating initial transient effects, and the weights of the readout signals for providing an appropriate output signal may be determined by a standard linear regression method. Alternatively, an online learning process also could be used, whereby input signals are continuously or in batch provided to the at least one input nod of the computing reservoir and whereby the weights are gradually corrected based on the instantaneous error that is detected, e.g., based on the estimated sensitivity of these weights to errors.

Other steps may be added as will be apparent to the skilled person, in accordance with reservoir computing methods as known in the art. For example, during training, noise may be inserted into the reservoir dynamics, e.g., by adding noise on the input and/or by adding a noise component to the teacher output, in order to improve robustness of the computing reservoir output. The latter typically is referred to as regularisation.

As a method according to a first exemplary embodiment, a method 10 for characterizing an input signal is disclosed which makes use of electromagnetic waves, e.g., of coherent or partially coherent light, such as generated by a laser or a light emitting diode (LED) with pinhole collimation. Such method may comprise the steps of providing 11 an input signal to at least one input node of a computing reservoir, e.g., to an optical coupler for coupling light into an integrated photonic computing reservoir chip, by temporally encoding the input signal in an electromagnetic wave, e.g., in an at least partially coherent light wave, on the at least one input node, e.g., coupled into the optical coupler.

The method may further comprise propagating 12 the electromagnetic wave via a plurality of passive interconnections, e.g., integrated optical waveguides on the integrated photonic computing reservoir chip, between discrete nodes of the computing reservoir. Each discrete node may be adapted for passively relaying the electromagnetic wave over the passive interconnections connected thereto. For example, the discrete nodes may comprise integrated beam splitters and/or integrated beam combiners. The discrete nodes may be connected to at least one incoming passive interconnection for receiving at least one incoming electromagnetic wave, which may be combined, e.g., for more than one incoming passive interconnection, and relayed to an outgoing passive interconnection or distributed over a plurality of outgoing passive interconnections.

The method may further comprise obtaining 13 a plurality of readout signals, in which each readout signal is determined by a non-linear relation to the electromagnetic wave in at least one readout node of the computing reservoir, e.g., the intensity or power of the electromagnetic wave at at least one readout node may be determined through a measurement device. For example, each readout node may be an integrated photonic intensity or power meter or an integrated coupler for coupling the electromagnetic wave into an output waveguide or fiber which has an intensity or power meter connected thereto.

The method may further comprise combining 14 the plurality of readout signals into an output signal, in which this combining takes a plurality of training parameters into account. For example in a learning phase, the training parameters, e.g., linear regression coefficients, may have been determined for matching a combination, e.g., a linear combination, of the readout signals corresponding to specific input signals provided to the reservoir to corresponding specific target output signals.

In a second aspect, the present invention relates to a computing reservoir device for characterizing an input signal. Such computing reservoir device comprises a plurality of discrete nodes and a plurality of passive interconnections between these discrete nodes for propagating a photonic wave between the discrete nodes. Each of these discrete nodes is adapted for passively relaying the photonic wave over the interconnections connected thereto. The discrete nodes comprise at least one input node for receiving an input signal and temporally encoding the input signal in the photonic wave on the at least one input node, the discrete nodes also comprise at least one readout node for providing a plurality of readout signals, in which each readout signal is determined by a non-linear relation to the photonic wave in the at least one readout node. The computing reservoir device may also comprise a processor for combining the plurality of readout signals into an output signal. This combining furthermore takes into account a plurality of training parameters.

Referring to FIG. 2, an exemplary computing reservoir device 20 according to embodiments of the second aspect of the present invention is shown. This computing reservoir device 20 comprises a plurality of discrete nodes 22 and a plurality of passive interconnections 23 between these discrete nodes 22 for propagating a photonic wave between the discrete nodes, in which each discrete node is adapted for passively relaying the photonic wave over the interconnections connected thereto.

The plurality of passive interconnections, or a subset of the plurality of interconnections 23, may form at least one closed loop to maintain at least a short-term memory of the photonic wave, e.g., at least some interconnections may form a feedback loop involving at least one of the discrete nodes along this loop. Therefore, the photonic wave may be recombined with previous states of the photonic wave, e.g., with attenuated previous states such that a fading memory effect is achieved. Since the interconnections 23 and discrete nodes 22 are essentially passive, this attenuation may occur in a natural fashion, e.g., through dispersion and decohesion of waves, propagation loss, or in an engineered fashion, e.g., due to purposeful passive attenuators in at least some of the discrete nodes or interconnections.

The passive interconnections 23 may also comprise at least one delay line for transmitting the photonic wave with a predetermined delay, for example, to scale the response of the computing reservoir device with the speed at which input signals are provided thereto and/or readout signals are acquired and processed. Such optical delay lines, may also assist in obtaining a desired memory effect in the computing reservoir device 20, as will be understood by the skilled person.

At least a subset of the passive interconnections 23 may imprint a regular grid spatial structure on the computing reservoir device 20. Alternatively or additionally, at least a subset of the interconnections may imprint a modular or stratified spatial structure on the computing reservoir device 20.

The discrete nodes 22 also comprise at least one input node 21 for receiving an input signal and temporally encoding the input signal in the photonic wave on the at least one input node 21. For example, this at least one input node 21 may comprise an optical coupler for receiving an input light wave and relaying this input light to the computing reservoir via the input node, a light source, such as a led or laser for receiving the input signal as a control current and sending a coherent or partially coherent light wave via the input node through the computing reservoir.

The discrete nodes 22 also comprise at least one readout node 24 for providing a plurality of readout signals, in which each readout signal is determined by a non-linear relation to the photonic wave in the at least one readout node.

The at least one readout node 24 may have no output interconnections, e.g., none of the passive interconnections 23 may receive an input from the at least one readout node 24 for relaying the photonic wave from the at least one readout node 24 back to another discrete node 22. Therefore, after training of the computing reservoir device, a substantially passive signal processing network may be obtained.

However, in different embodiments, the at least one readout node 24 may have at least one of the passive interconnections 23 connected as output interconnection thereto for feeding back the photonic wave to at least one discrete node 22 of the computing reservoir device, such that an active signal processing or signal generation network may be obtained after training.

The reservoir computing device 20 further may comprise a processor 25 for combining the plurality of readout signals into an output signal, in which this combining takes a plurality of training parameters into account.

In the examples hereinbelow, experimental results and simulations are provided for demonstrating the suitability of an integrated passive silicon photonics chip according to embodiments of the present invention for use as a computing reservoir. Thanks to the reservoir computing paradigm, the same generic architecture can be used to calculate arbitrary boolean logic operations with memory up to 12.5 Gbit/s, as well as for performing isolated spoken digit recognition. Apart from the versatility, other advantages of a passive silicon photonics reservoir chip are zero power consumption, e.g., except at inputs and outputs, the ability to exploit phase for reservoir operations and excellent scalability to larger networks and higher bitrates. For example, 20 to 200 Gbit/s may be trivially possible by eliminating the on-chip delay lines discussed below. In this example, artificial delay lines were included on the integrated photonic chip device in order to slow it down sufficiently so as to be measurable with commonly available equipment. However, to make this compatible with high-speed systems, the delay lines need simply to be shortened or eliminated altogether. Embodiments of the present invention can therefore provide useful integrated photonic reservoir computing for a wide range of applications.

The reservoir computing device according to this particular example comprises a passive optical network, e.g., consisting of only waveguides, splitters, combiners and/or other passive optical elements, and does not contain non-linear elements except at the readout stage. The non-linearity may be created at the readout level, where the complex amplitudes are converted into real-valued powers, e.g., light intensity measurements. Thus, the nonlinearity, assumed to be a desirable property according to previous work in the art, is no longer present in the reservoir itself, but is rather implemented at the readout by converting the complex amplitudes of the photonic waves propagating through the reservoir nodes into real-valued power levels. The readout signals obtained through this non-linear relation may then be used as input for a linear classifier. In this way, the reservoir itself consumes zero power, and its timescale is determined by the interconnection delay between nodes. In exemplary chip discussed here, 2 cm delay spirals were used to bring this speed down to a range of 0.125-12.5 Gbit/s, but by trivially eliminating these delay lines speeds up to 5-500 Gbit/s, e.g., corresponding to a 40 times reduction resulting in interconnections down to 500 µm, may be obtained. A further reduction to allow for even faster speeds (e.g., with interconnections of 200 µm) may require some redesigning of the exemplary reservoir design discussed here, e.g., to achieve an extremely compact footprint. This redesigning can be performed using ordinary skill in the art, as willed be understood by the skilled person.

Such a passive nanophotonic silicon reservoir can be used as a generic computational platform for diverse tasks, both digital and analog. Experimental results provided further hereinbelow demonstrate that the chip is capable of performing arbitrary Boolean logic operations with memory on a time stream, like x[−2] XOR x[−3], or x[−1] NAND x[−2], where x[−n] is the input n bits in the past. Furthermore, good correspondence is achieved between simulation and experiment.

It is also demonstrated by the simulation results hereinbelow that the same chip is capable of performing a high-speed analog task, namely that of isolated spoken digit recognition.

Figure 3:
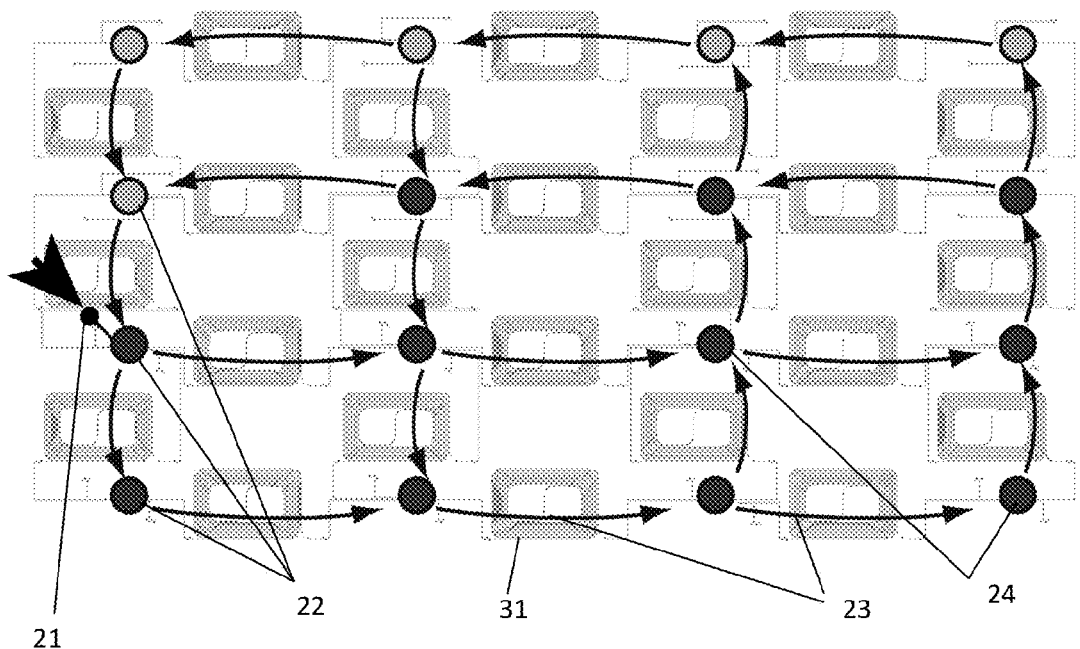
FIG. 3 shows a device according to a first exemplary embodiment of the present invention, whereby a design of a 16 node swirl passive reservoir in 4×4 configuration is shown overlain with the topology.

The exemplary chip design for this example is shown in FIG. 3, which shows a 16 node reservoir having a 4-by-4 so-called "swirl" topology, which creates feedback loops in the network. Underneath, the actual chip design is visible and the connections 23 consist of 2 cm long low-loss spirals 31 (1.2 dB loss per spiral) corresponding with an interconnection delay of around 280 ps. These delay lines have the sole purpose of slowing down the reservoir such that it becomes accessible with commonly available experimental equipment.

All shown connections are essentially bidirectional, but by using one input 21 the light flows according to the overlain arrows. Readouts were obtained at the 11 nodes marked with a full dot were measured.

Indeed, as the network is passive, the timescales that matter are the speed of the signal itself and the interconnection time delays. Therefore, the reservoir was also studied as a function of the delay/bit period ratio. A small/high ratio means that the signal is slow/fast relative to the network connections. The measurement equipment for this example allowed to scan bitrates between 125 Mbit/s and 12.5 Gbit/s, which corresponds to a range of situations where the delay is only a fraction of the bit period to situations where the delay is a multiple of the bit period.

The footprint of the exemplary reservoir chip is 16 mm$^2$, mostly because of the size of the spirals. To ensure low losses, these spirals were shallow etched waveguides with a bending radius of 40 nm. A chip with shorter interconnections for higher speeds would allow using spirals with deep etched waveguides. This may be lossier, but provides a smaller footprint as the bending radius is around 5 nm (1.36 dB/cm versus 0.3 dB/cm), allowing for an even greater size reduction.

Coupling and splitting between the nodes is done with a combination of 1×2 and 2×2 Multi-Mode Interferometers (MMI) with very low insertion loss and broadband operation over the wavelength range of the grating couplers used to couple light on and off chip. The loss per grating coupler is 5-6 dB. The chip is made on a Silicon-on-Insulator platform (SOI) (www.epixfab.eu), which uses the manufacturing tools from the semiconductor electronics industry. This holds the promise for mass production at low cost and the high-index contrast of SOI allows for a much smaller footprint than what is possible in other material platforms.

The passive reservoir was fabricated on a Silicon-on-Insulator wafer with 193 nm DUV lithography. The SOI structure was designed with a top silicon layer of 220 nm and a buried oxide layer of 2 mm.

Making active components in SOI is a topic of ongoing research as silicon has an indirect bandgap, but as the presented exemplary reservoir according to embodiments of the present invention is passive, one can take full advantage of the maturity of silicon processing technology.

The coupling to and from the chip was performed with a vertical fibre setup.

In a first example of measurement and simulation relating to a Boolean task, 10000 bits were divided into 10 sets of 1000 bits used in turn for training and testing through 5-fold cross-validation and ridge regression to avoid over-fitting. The pattern of 10000 bits was generated with an Anritsu MP2101A Pulse Pattern Generator and the measured signal was first amplified with a Keopsys EDFA, then filtered and finally detected with a LeCroy WaveExpert 100H.

After training the readout weights on the training bit stream, both the tested output (which consists of applying those weights to the states of the reservoir of the test bit stream) and desired output are sampled at the middle of the bit period and thresholded at the middle of the bit amplitude. These two bit streams are then compared to determine the performance of the system, yielding an error rate. The desired bit stream is constructed from the input bit stream depending on the Boolean operation that needs to be solved. The 11 measured reservoir states are padded initially with zeros depending on the signal frequency and the physical interconnection distance from the input node in FIG. 3.

An optical stream of 10000 bits, modulated on a wavelength of 1531 nm at the maximum transmission of the grating couplers, were sent into the input node 21 of the chip, and the response was measured at the eleven readout nodes 24 marked with a filled-in dot on FIG. 3. The other 5 nodes had output powers below the noise floor (±−40 dBm or 100 nW) of the Erbium-Doped Fiber Amplifier (EDFA) used for this example. However, more nodes may be measured by amplifying the input signal and by using more efficient couplers to and from the chip. The amplified responses were measured with an optical sampling scope and saved to a computer where they were used for offline training with a freely available toolbox. The measured states are trained to follow a certain desired output, e.g., the XOR of the present bit and the previous bit, and the difference between the trained output and the desired output gives the Error Rate (ER).

Figure 4:
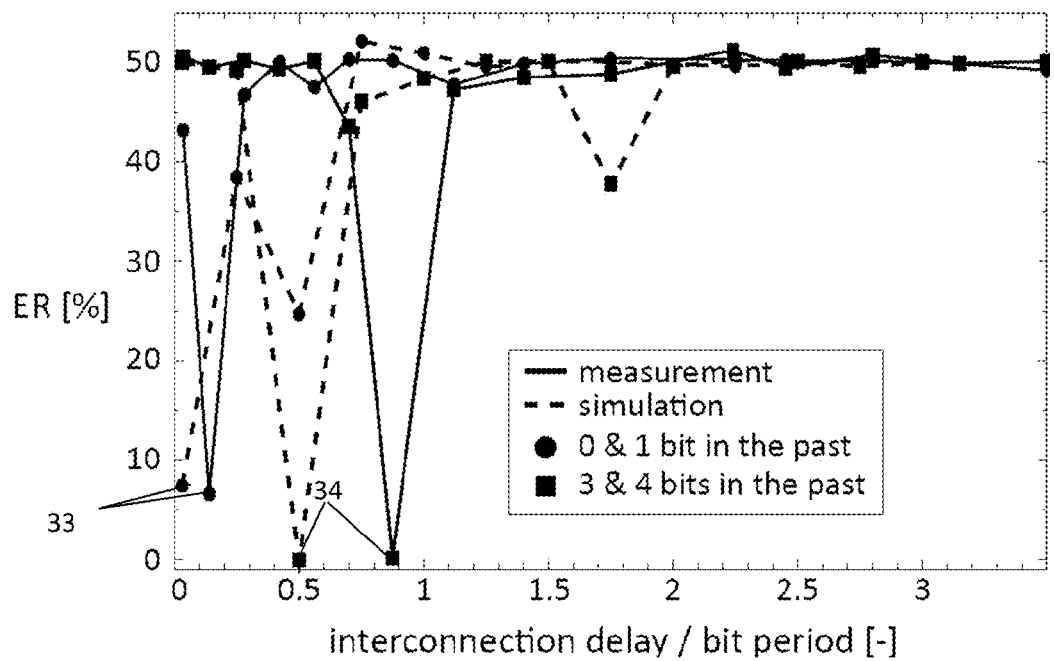
FIG. 4 shows the Error Rate for a 2 bit XOR task trained and tested on measured and simulated data in accordance with the first exemplary embodiment of the present invention.

FIG. 4 shows that for a 0.14 delay/bit period ratio a good performance is achieved for the XOR of the present and previous bit. The plots show a first graph 33 for x–0 XOR x–1 and a second graph 34 for x–3 XOR x–4.

The network was also simulated, which produced a similar response, apart from the local minimum of 25% at a 0.5 delay/bit period ratio that was obtained for the simulated network. The simulated results are shown with dashed interconnecting lines, while the experimental results are shown with full interconnecting lines on FIG. 4.

Note that despite its apparently simplicity, this XOR task with memory is considered to be a hard problem in machine learning, as it cannot be solved by mere linear regression on the inputs, but a result of 25% is, however, possible as a suboptimal solution, e.g., in this case one of the four solutions is constantly misclassified. Also, for the XOR of the third and fourth bit in the past, a good agreement between measurement and experiment is obtained, albeit at slightly different delay/bit period ratios. This may be likely caused by small differences between the simulated reservoir and the one actually fabricated.

Figure 5:
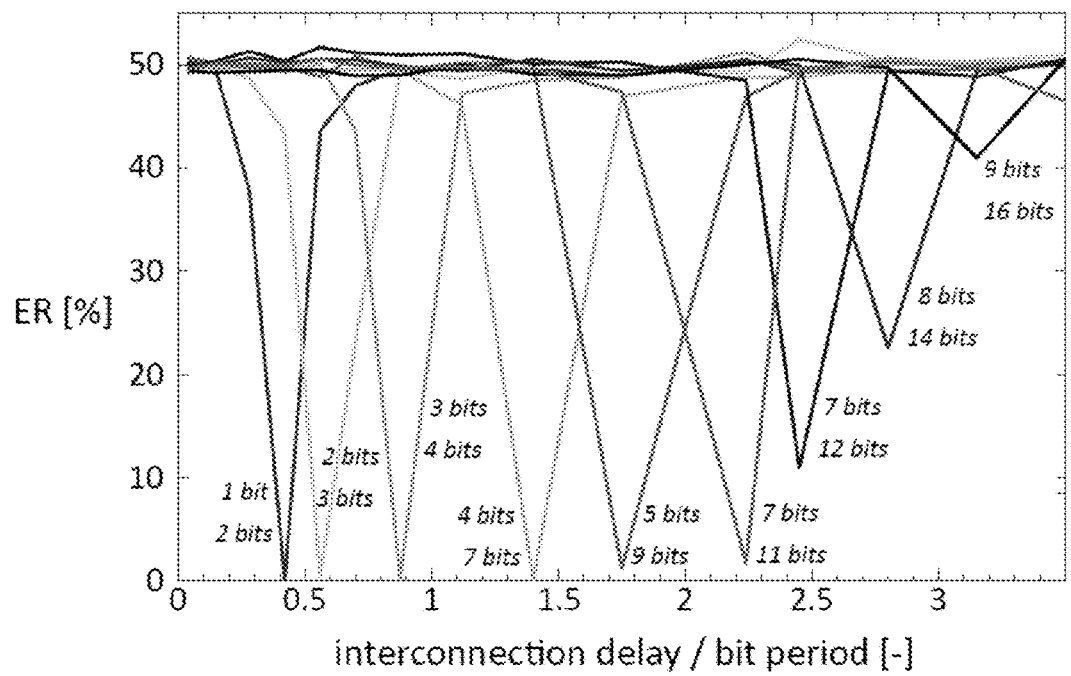
FIG. 5 shows results for the 2 bit XOR task with measured data for a wide variety of bit pairs in the bit stream in accordance with the first exemplary embodiment of the present invention.
Figure 6:
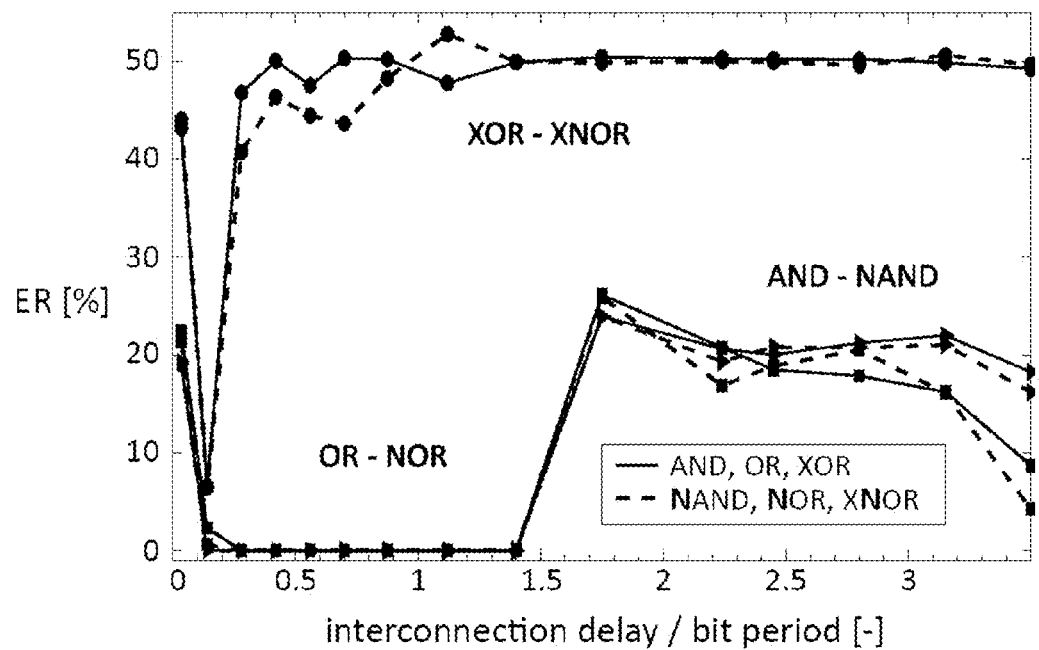
FIG. 6 shows results for other Boolean tasks on the measured data in accordance with the first exemplary embodiment of the present invention. The results for an operation and its negation are the same (e.g., AND versus NAND). Shown here are the results for x[−0] OPERATION x[−1] (where x[−n] denotes the binary input value of n bit periods ago) although other bit combinations would also be possible.

It may be important to note that the generic network, which was not at all specially optimized and designed for a 2 bit XOR with one bit delay, can solve the XOR of many different bit combinations, as illustrated by FIG. 5, and other Boolean operations, as illustrated by FIG. 6, demonstrating the general applicability of the RC paradigm. Since the optimum exists for certain delay/bit period ratios, chips can easily be designed to handle very high speeds. For example, a signal of 100 Gbit/s requiring a ratio of 0.5 needs a delay of 50 ps (±0.5 mm), which is perfectly feasible. The optimal delay/bit period range for the different tasks in FIG. 6 is 0.14-1.4 and in case the connections are shortened to 500 µm, this leads to a theoretical optimal bitrate range of 20-200 Gbit/s.

Figure 7:
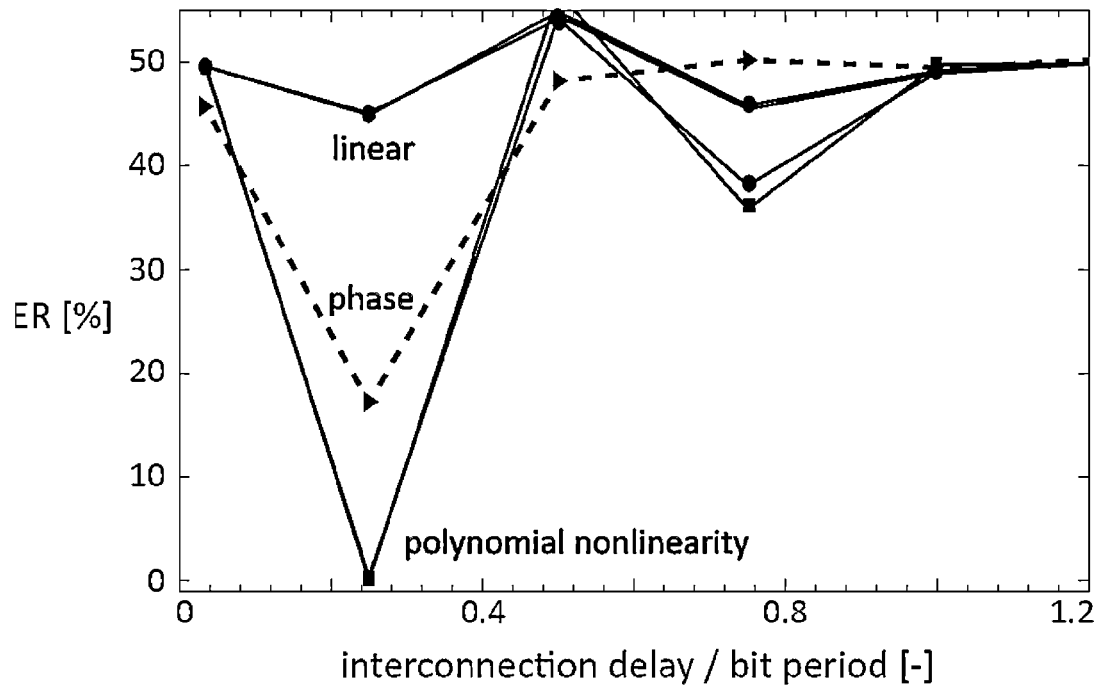
FIG. 7 shows results for a 2 bit XOR task for one and two bits in the past (x[−1] XOR x[−2]) in accordance with a first exemplary embodiment of the present invention. These results are grouped depending on the nonlinearity of the readout.

The nonlinearity present in this system is further investigated hereinbelow, as reservoirs usually need some kind of nonlinearity to solve nonlinear tasks (the XOR being one of them). As mentioned before, the reservoir in accordance with embodiments of the present invention is passive, and there is no apparent nonlinearity to be found there. However, light detectors measure intensity, which means that the square is taken from the absolute value of the complex amplitude of coherent light. This operation matters as can be seen in the simulation results of FIG. 7. Linear readouts are not capable of solving the x–1 XOR x–2 task. However, as soon as there is a polynomial functionality in the readout, as for example happens in a real photodetector, the task becomes solvable.

Linear operations such as utilizing a complex readout with complex weights working directly on the complex amplitude, e.g., linear in the complex plane, or using only optical powers in the reservoir, e.g., without phase information and thus incoherent light, yield a very bad performance for the XOR task. However, as soon as there is a kind of polynomial nonlinearity in the detection, e.g., the absolute value of the complex amplitude or the square of it as in standard detectors, the performance is good. When only the phase information is used, a nonlinear operation itself, the performance is somewhere in between. This means that the easiest approach to detecting the photonic states, employing normal photodetectors, may also be the most powerful for RC. The phase information does not need to be extracted separately as it is already captured in the interference effects seen in the intensities. In the present example, the readout and linear regression was still implemented in the electrical domain. However, it is conceptual easy to also implement this linear combination of states in the optical domain, as will be apparent to the person skilled in the art, where a set of modulators or amplifiers implement the weights. In this case, however, the nonlinear operation would be performed after taking the weighted sum in the complex domain, requiring a more complex training procedure that the common linear regression.

In a second exemplary task, isolated spoken digits, 'zero' to 'nine', were classified. In the data set, these words are each spoken 10 times by 5 female speakers, giving 500 samples, taken from the TI46 speech corpus. For speech recognition, some pre-processing of the raw speech signal is commonly performed. These methods often involve a transformation to the frequency domain and a selective filtering based on known psycho-acoustic properties of the human ear and/or spectral properties of speech. To shorten the simulation time, a decimation of the input signals with a factor of 128 was also applied. The output was obtained by training ten distinct linear classifiers, one for each digit. Each trained output should return the value +1 whenever the corresponding digit is spoken and −1 otherwise. During testing, a winner-take-all approach was used to determine which word was spoken. The word error rate (WER), which is ($N_{nc}/N_{tot}$), with $N_{nc}$ the number of incorrectly classified samples, and $N_{tot}$ the total number of samples, determines the performance. Since it is possible to achieve a WER very close to 0%, babble noise from the NOISEX database was added with a SNR of 3 dB. The results are always averaged over 10 runs. Ridge regression was used to avoid over-fitting and five-fold cross-validation was used to make the results more robust.

Figure 8:
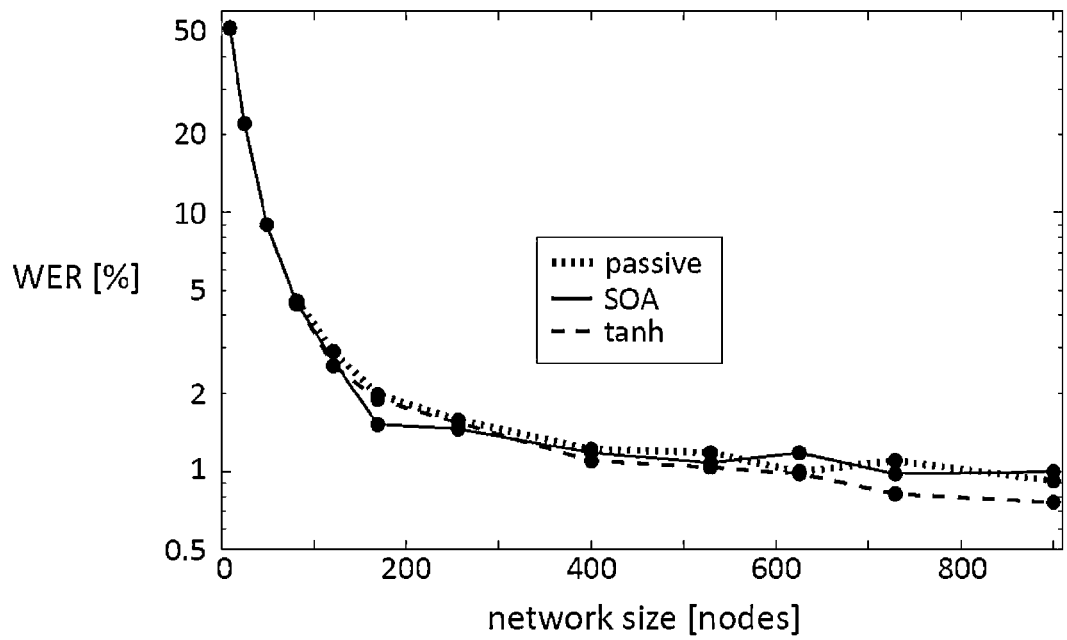
FIG. 8 shows simulation results for an isolated digit speech recognition task for coherent networks with three different node types in accordance with embodiments of the present invention. Phase information was used and the networks have the optimal delay selected for the speech task.

The most important properties of photonic reservoirs in general by means of simulations for an isolated digit recognition task were already studied in Vandoorne et al. in IEEE Transactions on Neural Networks 22(9), pp 1460-1481 discussed in the background section hereinabove. The reservoir employed there was a network of coupled SOAs and by working at an optimal delay and in the coherent regime, better results than with classical real-valued reservoirs in software were achieved. FIG. 8 shows that the same kind of performance can also be achieved by replacing the SOA chip with the passive silicon network as used in the digital task example hereinabove. Since no high-speed analog arbitrary waveform generator was readily available, this was not tested experimentally, but the good correspondence between theory and experiment for the digital task leads to the conclusion that the same architecture can also be used for solving analog problems.

The invention claimed is:
1. A method for characterizing an input signal, the method comprising the steps of:
   providing an input signal to at least one input node of a computing reservoir by supplying at least one photonic wave to the at least one input node and by temporally encoding the input signal by modulating the at least one photonic wave as function of the input signal,
   propagating said at least one photonic wave via passive guided or unguided propagation between discrete nodes of said computing reservoir, each discrete node being adapted for passively relaying the at least one photonic wave over the passive interconnections connected thereto, obtaining a plurality of readout signals, in which each readout signal is determined by a non-linear relation to the at least one photonic wave in at least one readout node of said computing reservoir, and combining said plurality of readout signals into an output signal, said combining taking into account a plurality of training parameters.

2. The method according to claim 1, in which obtaining the plurality of readout signals comprises obtaining the plurality of readout signals, wherein each readout signal is determined by an intensity, energy or power measurement of said at least one photonic wave in the at least one readout node.

3. The method according to claim 1, further comprising training said training coefficients by providing a plurality of training input signals to the at least one input node of the computing reservoir and determining said training parameters by evaluating a difference between the plurality of readout signals and reference output signals corresponding to the plurality of training input signals.

4. A computing reservoir device for characterizing an input signal, the computing reservoir device comprising a plurality of discrete nodes and a plurality of passive interconnections between these discrete nodes for propagating the at least one photonic wave between the discrete nodes, in which each discrete node is adapted for passively relaying the at least one photonic wave over the interconnections connected thereto, the discrete nodes comprising:

at least one input node configured for receiving an input signal and temporally encoding the input signal in the at least one photonic wave on said at least one input node, and at least one readout node configured for providing a plurality of readout signals, in which each readout signal is determined by a non-linear relation to said at least one photonic wave in the at least one readout node, the device further comprising a processor programmed for combining said plurality of readout signals into an output signal, said combining taking into account a plurality of training parameters.

5. The device according to claim 4, in which at least a subset of said passive interconnections form at least one closed loop to maintain at least a short-term memory of said at least one photonic wave.

6. The device according to claim 4, in which the passive interconnections comprise a delay line for transmitting said at least one photonic wave with a predetermined delay.

7. The device according to claim 4, in which at least a subset of said passive interconnections imprint a regular grid spatial structure on the computing reservoir device.

8. The device according to claim 4, in which at least a subset of said interconnections imprint a modular or stratified spatial structure on said computing reservoir device.

9. The device according to claim 4, in which each of said passive interconnections provide a predetermined delay and/or attenuation of the at least one photonic wave when transferred via said interconnection.

10. The device according to claim 4, in which said at least one photonic wave is an at least partially coherent light wave.

11. The device according to claim 4, in which the plurality of discrete nodes comprise passive optical splitters and/or optical combiners and said plurality of passive interconnections comprise optical waveguides and/or optical fibres.

12. The device according to claim 4, in which the at least one input node comprises an optical coupler for receiving the input signal as a light wave coupled into the reservoir computing device.

13. The device according to claim 4, in which the at least one readout node comprises an optical coupler for coupling out the light wave from said at least one readout node to a light intensity meter for producing the at least one readout signal, or in which the at least one readout node comprises a light intensity meter for producing a light intensity measurement at the at least one readout node as the at least one readout signal.

14. The device according to claim 4, wherein the computer reservoir device is a passive silicon photonics reservoir.

* * * * *

UNITED STATES PATENT AND TRADEMARK OFFICE
CERTIFICATE OF CORRECTION

PATENT NO.        : 9,477,136 B2
APPLICATION NO.   : 14/324459
DATED             : October 25, 2016
INVENTOR(S)       : Bienstman et al.

It is certified that error appears in the above-identified patent and that said Letters Patent is hereby corrected as shown below:

On the Title Page
    Item (73), Assignees, change "IMEC VCW" to --IMEC VZW--

Signed and Sealed this
Third Day of January, 2017

Michelle K. Lee
*Director of the United States Patent and Trademark Office*